United States Patent
G (10) Patent No.: US 9,646,438 B2
(45) Date of Patent: May 9, 2017

(54) DEVICE OPERATIONS BASED ON CONFIGURABLE INPUT SEQUENCES

(71) Applicant: Amazon Technologies, Inc., Reno, NV (US)

(72) Inventor: Narasimha G, Bangalore (IN)

(73) Assignee: Amazon Technologies, Inc., Reno, NV (US)

( * ) Notice: Subject to any disclaimer, the term of this patent is extended or adjusted under 35 U.S.C. 154(b) by 543 days.

(21) Appl. No.: 14/034,309

(22) Filed: Sep. 23, 2013

(65) Prior Publication Data

US 2015/0084743 A1    Mar. 26, 2015

(51) Int. Cl.
| | | |
|---|---|---|
| *G05B 19/00* | (2006.01) | |
| *G07C 9/00* | (2006.01) | |
| *G06F 3/0487* | (2013.01) | |
| *G06F 3/01* | (2006.01) | |
| *G06F 3/023* | (2006.01) | |
| *G06F 3/0354* | (2013.01) | |

(52) U.S. Cl.
CPC .......... *G07C 9/00158* (2013.01); *G06F 3/011* (2013.01); *G06F 3/0233* (2013.01); *G06F 3/03547* (2013.01); *G06F 3/0487* (2013.01); *G06F 2203/0338* (2013.01)

(58) Field of Classification Search
None
See application file for complete search history.

(56) References Cited

U.S. PATENT DOCUMENTS

| | | | | |
|---|---|---|---|---|
| 4,577,345 A | * | 3/1986 | Abramov | G06K 9/0002 340/5.82 |
| 8,224,293 B1 | * | 7/2012 | Knapp | G06F 21/35 235/382 |
| 8,918,854 B1 | * | 12/2014 | Giobbi | G06F 21/34 726/9 |
| 2009/0073112 A1 | | 3/2009 | Basson et al. | |
| 2009/0102604 A1 | * | 4/2009 | Madhvanath | G06F 3/03547 340/5.83 |
| 2009/0167492 A1 | * | 7/2009 | Madafferi | G07C 9/00158 340/5.82 |
| 2010/0138914 A1 | * | 6/2010 | Davis | G06F 21/32 726/19 |
| 2010/0185871 A1 | | 7/2010 | Scherrer et al. | |
| 2010/0237991 A1 | * | 9/2010 | Prabhu | G06F 3/03547 340/5.83 |

(Continued)

OTHER PUBLICATIONS

PCT/US2014/056979, "International Search Report and Written Opinion", Mar. 31, 2015, 10 pages.

*Primary Examiner* — Curtis King
(74) *Attorney, Agent, or Firm* — Kilpatrick Townsend & Stockton LLP (57) ABSTRACT

An electronic device may be configured to identify configuration information associated with input sequences. In some examples, the configuration information may enable an association between the input sequences and operations capable of being performed by the electronic device. Additionally, in some aspects, the electronic device may be configured to receive biometric inputs and determine an operation to be performed based at least in part on the received biometric inputs and the association. Further, the electronic device may enable performance of the determined operation.

20 Claims, 8 Drawing Sheets

(56) References Cited

U.S. PATENT DOCUMENTS

| | | | |
|---|---|---|---|
| 2010/0321158 A1* | 12/2010 | Setlak | G06F 21/32 340/5.83 |
| 2012/0174214 A1 | 7/2012 | Huang et al. | |
| 2012/0293642 A1 | 11/2012 | Berini et al. | |
| 2013/0009748 A1* | 1/2013 | Adams | G06F 21/35 340/5.83 |
| 2014/0173715 A1* | 6/2014 | Yano | G06F 21/32 726/16 |
| 2015/0116086 A1* | 4/2015 | Kim | G06F 21/32 340/5.83 |

* cited by examiner

DEVICE OPERATIONS BASED ON CONFIGURABLE INPUT SEQUENCES

BACKGROUND

User devices can operate in various operating modes. Users who wish to interact with such devices may do so from these various operating modes of the device, including but not limited to a lock screen, a home screen with no application active, and/or an active application. It is often the case that users execute the same sequences of actions repetitively throughout the day. For instance, a user who often utilizes a particular application may typically have to unlock the mobile device, navigate through the mobile device to find the application, and launch the application each time he wishes to interact with the application. The delay in access and repetitive nature of this method can be frustrating for the user. Additionally, with mobile devices being shared between multiple users, the actions or sequences of actions most often repeated can change with each user. Conventional attempts to solve these problems have been ineffective and/or have undesirable side effects or other drawbacks.

BRIEF DESCRIPTION OF THE DRAWINGS

Various embodiments in accordance with the present disclosure will be described with reference to the drawings, in which.

DETAILED DESCRIPTION

In the following description, various embodiments of the present disclosure will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process described may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

Techniques described herein are directed to systems and methods to enable a user of an electronic device to utilize biometric input to perform various user actions. Such user actions may include, but are not limited to, launching an application, performing an action within the operating system of the electronic device, and performing an action within an application running on the electronic device, to name a few. More specifically user actions include, but are not limited to, calling a contact, composing an email, turning the volume of the device up or down, muting the device, opening a new document, increasing or decreasing font size, launching a social media website or application, and posting the location of the user to a social media web site, to name a few. As will be appreciated by one skilled in the art, any suitable action or series of actions that may be taken by the user may be utilized by a biometric recognition service.

As used herein, a "lock screen" is a graphical user interface mode used by various operating systems to regulate immediate access to a device by requiring that the user perform a certain action in order to receive access. The "home" screen and application screen are further examples of graphical user interface modes. An "operating system," as used herein, refers to a collection of software that manages computer hardware resources and provides common service for computer programs. An "application," as used herein, is a software program that requires an operating system to function. Typically, the operating system acts as an intermediary between the application and the computer hardware.

As used herein, the term "biometric input" includes, but is not limited to, fingerprint scans, retina scans, or any suitable biometric data which enables a user to be uniquely identified within a degree of confidence. Though fingerprints are used herein as an illustrative example, any suitable biometric input may be used including, but not limited to, data corresponding to a retina, iris, face or hand. Additionally, biometric input may correspond to data generated by transducer sampling of biological phenomena and/or to a characterizing biometric "signature" based on such data.

Though a fingerprint scanner is used herein for illustrative purposes, any suitable biometric input device capable of communicating biometric information to an electronic device may be utilized. These biometric input devices may include, but are not limited to, capacitive sensors, optical sensors, thermal sensors, pressure sensors, RF sensors, and ultrasonic sensors, to name a few. The fingerprint scanner used in following examples may be a static or swiping fingerprint scanner. Additionally the fingerprint scanner may be an internal component of the device or an external component communicating with the device. Fingerprint inputs, as used herein, refer to data generated by a biometric scanner corresponding to a human fingerprint.

As part of a system or method for utilizing a biometric recognition service to perform user actions, a user may first access configuration settings to create associations between biometric inputs and a user action. For instance, the user may be presented with an interface for which the user may scan each of his fingers and assign a unique biometric identifier to the each fingerprint. Alternatively, the user may scan each finger and allow the biometric recognition service to automatically assign unique biometric identifiers to each fingerprint scan. As an example, perhaps the user scans in each finger of his right hand. The user may specify, or the system may automatically assign, the numbers one through five, sequentially, with the user's thumb assigned the number "1" and the pinkie finger assigned the number "5." The unique biometric identifier assignments and fingerprint scans may be stored for future use.

In accordance with at least one embodiment, the user may be presented with the ability to enter in a combination of fingerprint scans and an associated action. For instance, perhaps the user may be prompted for a fingerprint combination. The user may sequentially enter a scan of each his thumb, index and middle fingers. The biometric recognition service, receiving the fingerprint combination, compares each scan to the previously stored scans. Through these comparisons, the biometric recognition service is able to ascertain the proper biometric identifier for each scan, and thus, the corresponding numerical combination. In accordance with the example assignment above, the user's input may be determined to correspond to the combination "1, 2, 3."

In accordance with at least one embodiment, the user, having entered a combination of fingerprints, may be presented with the ability to specify a user action to associate with the combination. For instance, the user may select from a drop down menu, an action from predefined user actions. Additionally, the user may be presented with the ability to select a "recording" mode via the electronic device. While recording, the user may perform the desired action, or sequence of actions, while the biometric recognition service records the one or more user actions. Once the one or more user actions are recorded, the biometric recognition service may convert the recorded actions into computer commands. The corresponding computer commands may then be associated with the fingerprint combination and stored in a mapping or association. In one example, a table may be used for the mapping (also, referred to herein as an "association"), though the mapping may be stored in any suitable container or database capable of storing relationships between a sequence of biometric identifiers and a sequence of one or more of commands.

In accordance with at least one embodiment, the user may enter a fingerprint combination by sequentially scanning the fingers. Upon receipt of the sequence, the biometric recognition service may convert the received fingerprint scans into the appropriate numerical combination by matching the received fingerprint scans to stored fingerprint scans associated with particular biometric identifiers, as described above. The fingerprint service may then retrieve the appropriate one or more computer commands by using the numerical combination to perform a search on the mapping. Once the appropriate command is retrieved, the biometric recognition service may then cause the electronic device to perform the determined commands. Thus, in accordance with embodiments, systems and methods are provided for enabling a user to perform user actions utilizing fingerprint scan combinations.

Figure 1:
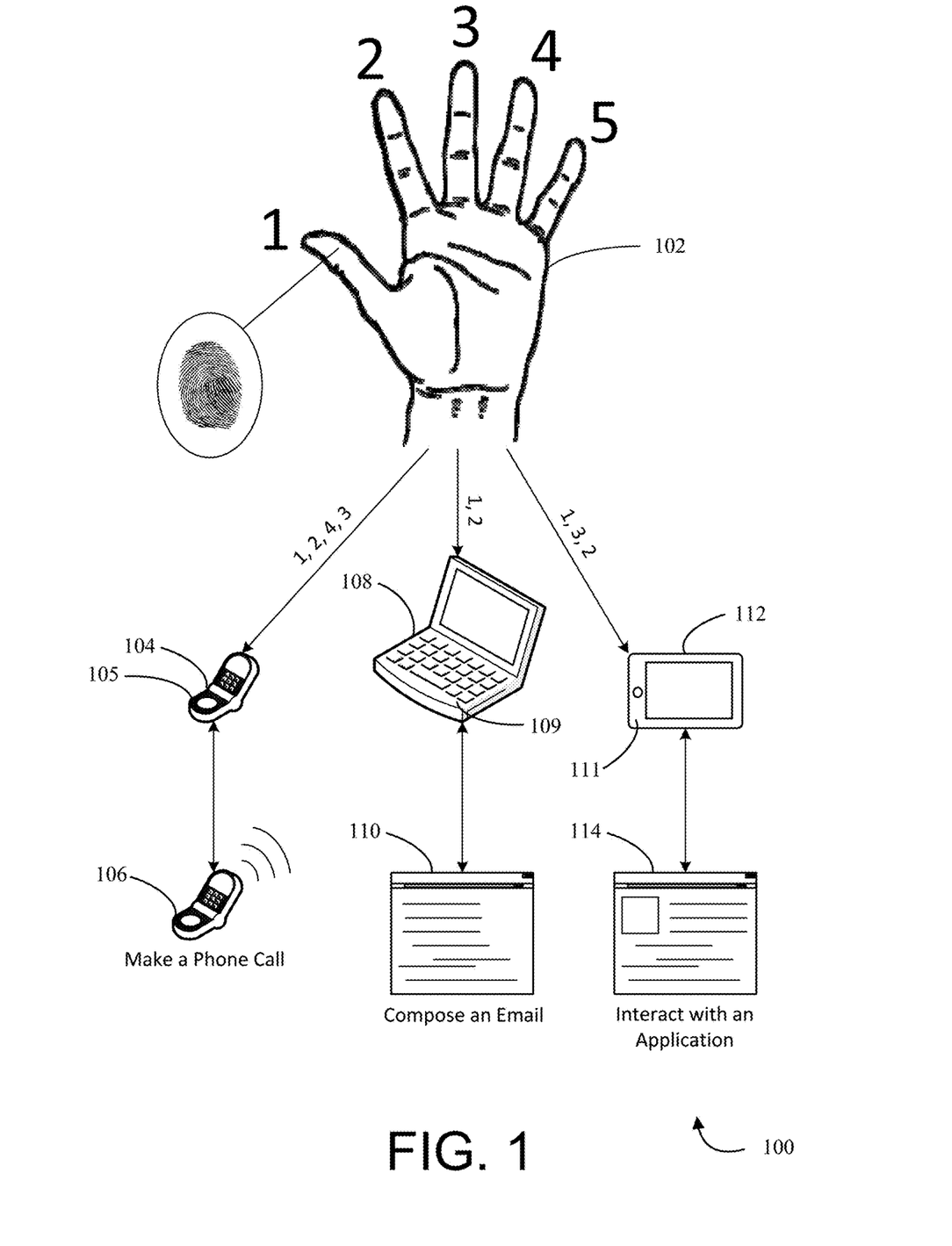
FIG. 1 illustrates an environment for implementing features of an example biometric recognition service in accordance with at least one embodiment.

Referring now to the drawings, in which like reference numerals represent like parts, FIG. 1 illustrates an environment for implementing features of an example biometric recognition service in accordance with at least one embodiment. As will be appreciated by one of skill in the art, any suitable device capable of receiving biometric input may be utilized. In this example, a cell phone, laptop, and a tablet PC are used for illustrative purposes and are not intended to limit the scope of the disclosure. In the embodiment shown in FIG. 1, a user may scan individual fingers of his hand 102. The individual fingers may each be assigned a biometric identifier. In the example shown, the number one through five may be sequentially assigned from thumb to pinkie.

In at least one example, the user may utilize the cell phone 104 to enter the combination "1, 2, 4, 3," by scanning the corresponding fingerprints using a fingerprint scanner 105, a component of the cell phone 104. Upon receipt of the combination, the command associated with calling a contact associated with the name "Mom" may be retrieved and the phone call 106 may be initiated.

In a further example, the user may utilize the laptop 108 to enter the combination "1, 2," using a fingerprint scanner 109, a component of the laptop 108. The combination "1, 2" may be determined to be associated with the action of composing an email 110. Once the action is determined, the biometric recognition service may cause the operating system of the laptop 108 to execute commands causing the operating system to launch the email application, and subsequently launch a window within the application for composing an email 110.

In another example, the electronic device utilized may be a tablet PC 112. The user may utilize a fingerprint scanner 111, a component of the tablet PC 112, to input a combination of fingerprint scans. In the example depicted in FIG. 1, the user may enter the combination "1, 3, 2," by scanning the appropriate fingers. The biometric recognition service may determine that the action corresponding to the combination "1, 3, 2," is an interaction with an application 114, the application running on the tablet PC 108. One such interaction may be a "buy now" feature of an online shopping application.

Though a cell phone 104, a laptop 108, and a tablet PC are used for illustrative purposes, the user may enter various combinations of his fingerprints utilizing any suitable device capable of receiving fingerprint inputs.

Figure 2:
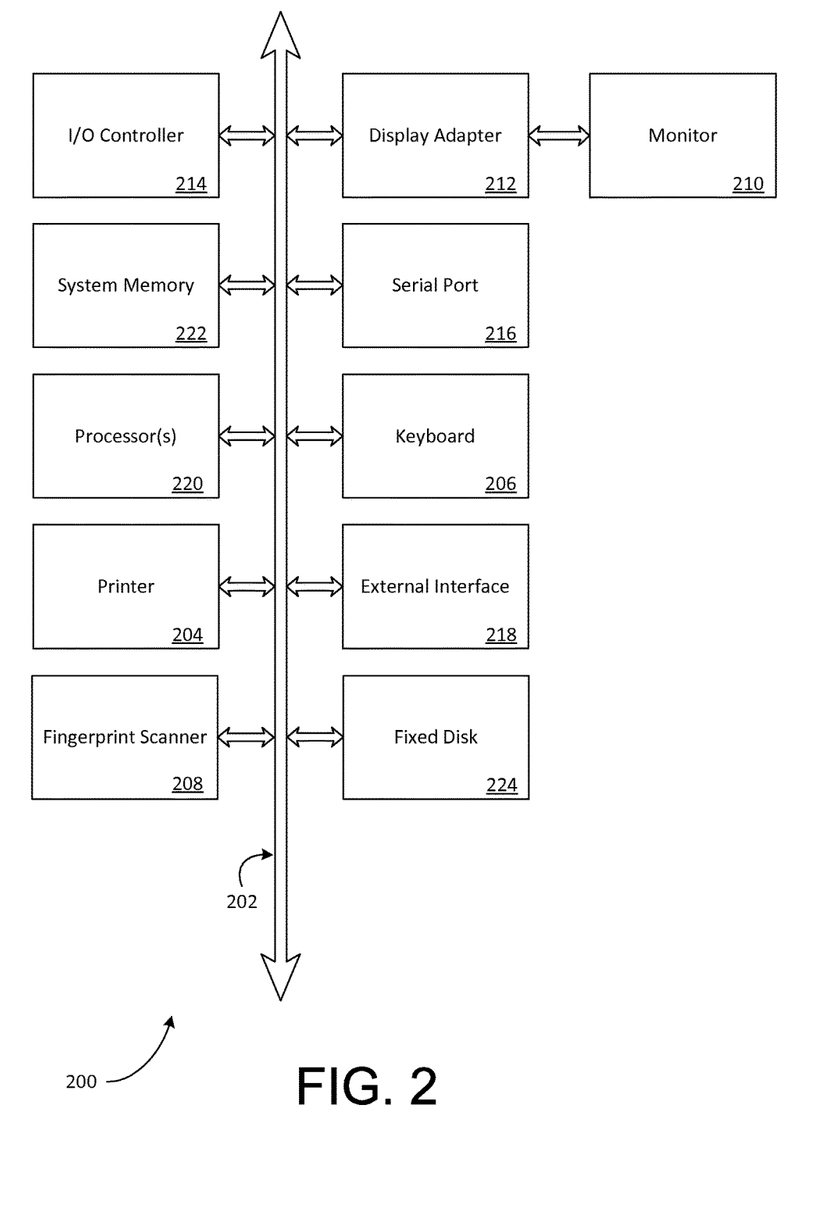
FIG. 2 is a schematic diagram that illustrates aspects of an example architecture for a computing device capable of providing a biometric recognition service in accordance with at least one embodiment.

FIG. 2 is a schematic diagram that illustrates aspects of an example architecture for a computing device capable of providing a biometric recognition service in accordance with at least one embodiment. The system, apparatus, methods, processes and/or operations for providing the features of a biometric recognition service may be wholly or partially implemented in the form of a set of instructions executed by one or more programmed computer processors such as a central processing unit (CPU) or microprocessor. Such processors may be incorporated in a computing device 201 operated by, or in communication with, other components of the system. Such a computing device 201 may be any suitable type of computing device 201 such as, but not limited to, a mobile phone, a smart phone, a personal digital assistant (PDA), a laptop computer, a desktop computer, a thin-client device, a tablet PC, an electronic book (e-book) reader, etc.

As an example, FIG. 2 depicts aspects of elements that may be present in a computer device 201 and/or system 200 configured to implement a method and/or process in accordance with some embodiments of the present disclosure. The subsystems shown in FIG. 2 are interconnected via a system bus 202. Additional subsystems include a printer 204, a keyboard 206, a fingerprint scanner 208, and a monitor 210, which is coupled to a display adapter 212. Peripherals and input/output (I/O) devices, which couple to an I/O controller 214, can be connected to the computer system by any suitable number of means known in the art, such as a serial port 216. The computer system may be made up of one or many computers. The serial port 216 or an external interface 218 can be utilized to connect the computer device 200 to further devices and/or systems not shown in FIG. 2 including a wide area network such as the Internet, a mouse input device, and/or a scanner.

The interconnection via the system bus 202 allows one or more processors 220 to communicate with each subsystem and to control the execution of instructions that may be stored in a system memory 222, and/or a fixed disk 224 as well as the exchange of information between subsystems. The processor(s) 220 may be implemented as appropriate in hardware, computer-executable instructions, firmware, or combinations thereof. Computer-executable instruction or firmware implementations of the processor(s) 220 may include computer-executable or machine-executable instructions written in any suitable programming language to perform the various functions described. The system memory 222 may store program instructions that are loadable and executable on the processor(s) 220, as well as data generated during the execution of these programs. Depending on the configuration and type of computing device, the system memory 222 may be volatile (such as random access memory (RAM)) and/or non-volatile (such as read-only memory (ROM), flash memory, etc.). The computing device may also include additional removable storage and/or non-removable storage including, but not limited to a fixed disk 224 including, but not limited to, magnetic storage, optical disks, and/or tape storage. The disk drives and their associated computer-readable media may provide non-volatile storage of computer-readable instructions, data structures, program modules, and other data for the computing devices. In some implementations, the system memory 222 may include multiple different types of memory, such as static random access memory (SRAM), dynamic random access memory (DRAM), or ROM.

Figure 3:
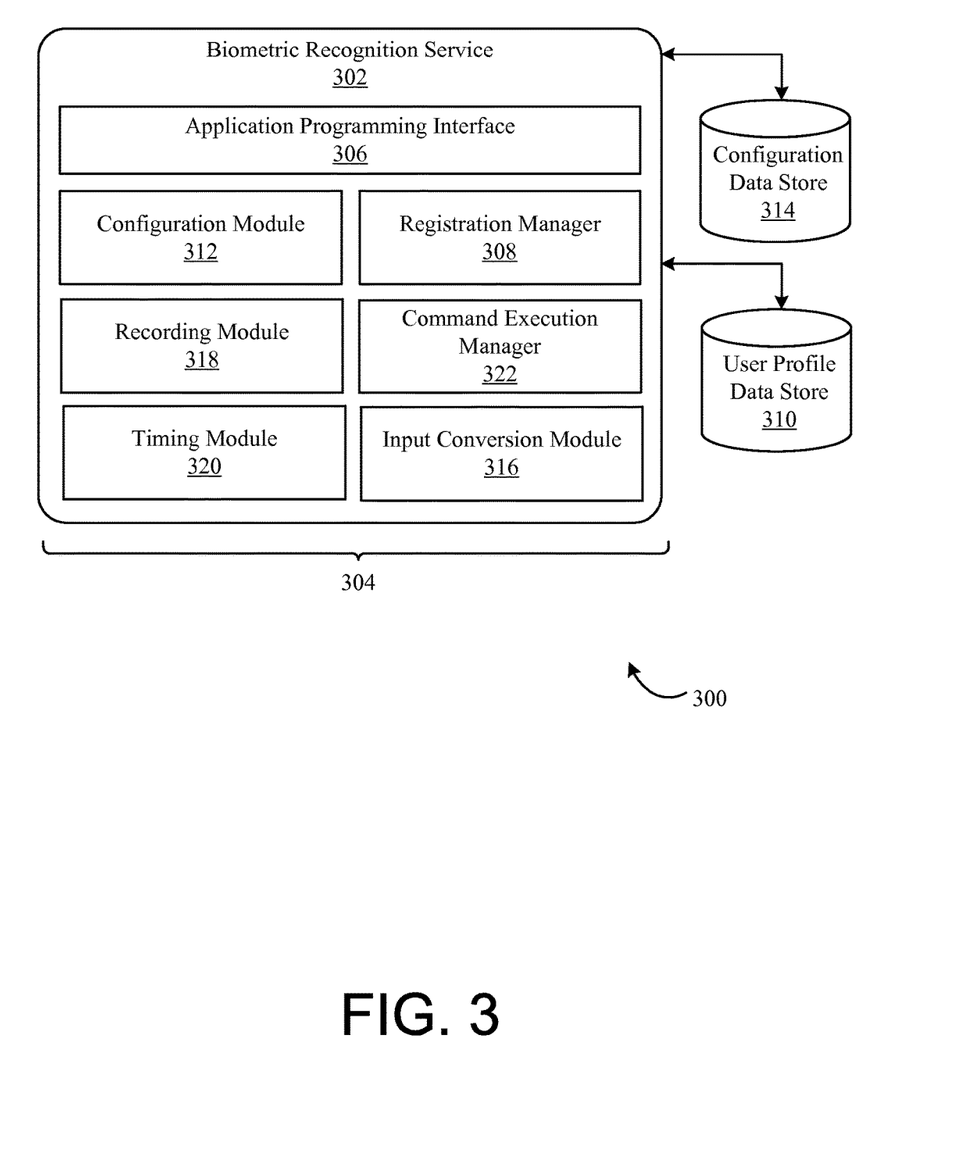
FIG. 3 is a schematic diagram illustrating aspects of an example computer architecture for a biometric recognition service including a plurality of modules in accordance with at least one embodiment.

FIG. 3 is a schematic diagram illustrating aspects of an example computer architecture for a biometric recognition service including a plurality of modules in accordance with at least one embodiment. If the modules 304 are software modules, the modules 304 can be embodied on a computer readable medium and processed by a processor in any of the computer systems described herein. It should be noted that any suitable module or data store described herein, may be, in some embodiments, a service responsible for managing data of the type required to make corresponding calculations. The modules may be configured in the manner suggested in FIG. 3 or may exist as separate modules or services external to the biometric recognition service 302.

In accordance with at least one embodiment, a method is enabled for executing user actions utilizing fingerprint scans inputs. For example, the biometric recognition service 302 may be a component of one of the electronic devices discussed above in connection with FIGS. 1 and 2. User selections may be input by the user via one of the aforementioned various biometric input devices. The user may register with the biometric recognition service 302 via an application programming interface 306. The registration manager 308, a component of the biometric recognition service 302, may be configured to receive such registration information. The registration manager 308 may be responsible for creating and maintaining user profiles that are stored in the user profile data store 310, or any other data store appropriate for the storage of such information. Additionally, the registration service 308 may be responsible for receiving registration information from various applications, further discussed below in FIG. 4.

In accordance with at least one embodiment, configuration information may be received by the biometric recognition service 302 via an application programming interface 306. Configuration information may include individual fingerprint scans used as baseline fingerprint scans. For instance, a user may scan each finger on his right hand, from thumb to pinkie Additionally, the user may manually assign an identifier to each finger. In one example, the user may assign the number "1" to his thumb, continuing sequentially until all five fingers are associated with a corresponding number. The configuration module 312 may be configured to receive such information. On receipt of the baseline scans, if the user has not manually assigned identifiers to the baseline fingerprint scans the configuration module 312 may automatically assign such identifiers. The configuration module 312 may store the baseline fingerprint scans in the user profile associated with the user and stored in the user profile data store 310, a configuration data store 314, or any other data store, internal or external to the biometric recognition service 302 capable of storing such information.

In accordance with at least one embodiment, the user may enter command configuration information by manually assigning a command offered, say, from a drop down menu for example, to a combination of one or more biometric identifiers. For instance, the drop down menu may enable the user to select "launch a web browser." The user may select this command and enter in the combination "1, 2, 3," indicating that the user wishes to scan his thumb, index and middle fingers in sequence to launch a web browser on the electronic device. As will be appreciated by one skilled in the art, various commands may be offered via the drop down menu and would depend on the electronic device and the applications available on the electronic device. Once a command is selected, and a combination entered, an association request may be sent to the biometric recognition service 302, and subsequently received by the configuration manager 312. The association request may contain, at least, the combination and selected command. The configuration manager 312 may communicate the selected command to the input conversion module 316, a component of the biometric recognition service 302. The input conversion module 316 may be responsible for converting a selected command into corresponding one or more device commands to be used by the electronic device to execute the action.

In accordance with at least one embodiment, subsequent to entering a combination, the user may enter a "recording" mode via the electronic device. The initiation of the recording mode may send an indication to the biometric recognition service 302 via an application programming interface 306. The recording module 318, a component of the biometric recognition service 302, may be configured to document user actions taken while the user is in recording mode. For instance, the user may select the recording mode. The recording module 318, receiving the indication of the initiation of record mode, may begin monitoring various actions taken by the user via the electronic device. In one example, the user may launch his contacts application on his smart phone, navigate to a contact named "Bob Sanders" and initiate a phone call to Bob. The corresponding actions may be documented by the recording module 318. The user may make a selection to indicate the completion of recording mode. This selection may cause an indication that recording is complete to be received by the recording module 318, causing the recording module 318 to cease its monitoring of user actions. Additionally, the selection may cause an association request to be received by the configuration module 312. Upon completion of the recording, the recording module 316 may communicate the user actions to the input conversion module 316. The input conversion module 316 may convert the recorded user actions into corresponding device commands to be executed on the electronic device.

In accordance with at least one embodiment, the input conversion module 316, upon completion of command conversion, may communicate the device commands to the configuration module 312. The configuration module, upon reception of the converted commands may cause an association to be created mapping the combination received, via the corresponding association request, to the converted commands. This mapping may be stored in the user profile associated with the user, the configuration data store 314 or any other suitable data store.

In accordance with at least one embodiment, a user entering a series of fingerprint scans as a combination may enter each scan within a configurable threshold of time. For instance, when the user commences the first scan, the scan may cause an indication to be sent to the timing module 320, a component of the biometric recognition service 302. The timing module 320 may be responsible for determining the completion of a user input if the user does not make another input within a threshold period of time. For instance, consider the case in which the threshold time is set to 3 seconds. The user, upon scanning a first finger, may need to scan a second finger within 3 seconds in order for the second finger scan to be included in the combination. If the 3 second threshold elapses, then the scan of the first finger may be determined to be the whole of the combination. The timing threshold may be configured by the user via selection of preferences. These preferences may be communicated to the biometric recognition service 302 and received by the configuration manager 312 to be stored in the user profile associated with the user. Future combination entries may be restrained by the timing module 320, by utilizing the current timing threshold stored in the user profile.

In accordance with at least one embodiment, a user may enter in a configured combination of fingerprint scans. Subsequently a command execution request may be sent to the biometric recognition service 302 via an application programming interface 306, and received by the command execution manager 322, a component of the biometric recognition service 302. The command execution manager 322 may be responsible for querying the configuration module 312, or searching the mapping to determine what corresponding commands to execute on the electronic device. Upon retrieving the device commands associated with the combination indicated in the command execution request, the command execution module 322 may cause the device commands to be executed on the electronic device.

In accordance with at least one embodiment, the user may indicate a "focus" for the command. For instance, when making selections for configuration options associated with combinations of fingerprint inputs and various user actions, the user may further indicate a particular focus to associate with the combination. In other words, the user may define the focus as being "operating system," "lock screen," or a particular application available on the electronic device. As a result, the user may intentionally assign the same combination to more than one corresponding action. For instance, a combination of "1" may launch a window to compose an email if initiated from the lock screen. The same combination may launch a social media application if initiated from the operating system of the device. Lastly, the same combination may initiate a purchase process if initiated via a shopping application. The corresponding focus associated with the combination may be received by the configuration manager 312 as a part of the association request and associated with the combination and corresponding device commands, as described above. Additionally, the focus of the user may be indicated in the command execution request, received by the command execution manager 322 and utilized in determining what device commands to execute.

Figure 4:
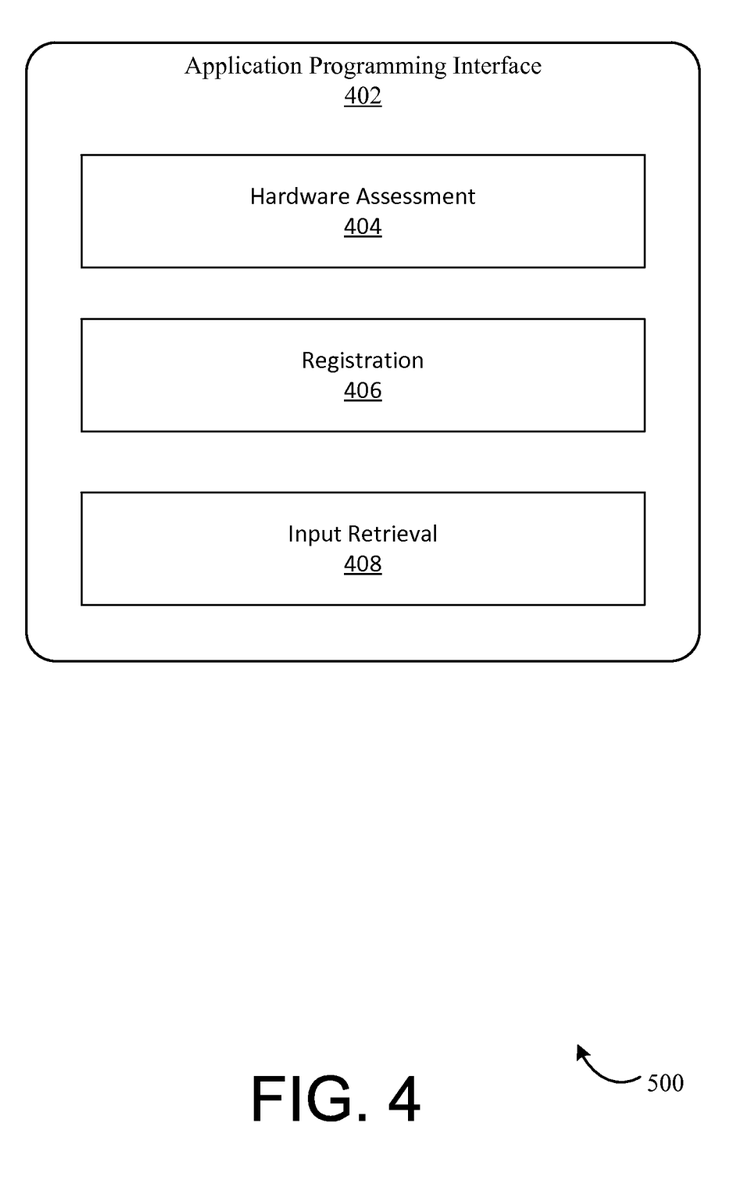
FIG. 4 is a schematic diagram depicting aspects of an example application programming interface in accordance with at least one embodiment.

FIG. 4 is a schematic diagram depicting aspects of an example application programming interface in accordance with at least one embodiment. For instance, the application programming interface 402 may be an application programming interface used by an application running on the electronic device to interact with the biometric recognition service (e.g. the biometric recognition service 302). The application programming interface 402 may include at least three interface uses. Though messages are used in the following examples, these interface uses may be implemented by function calls or other suitable programming interface elements. For instance, the application programming interface 402 may be used to assess the hardware capability of the electronic device. A hardware assessment message 404 may be sent by the application to the operating system to assess whether the electronic device is in communication with a biometric input device. If the electronic device is, in fact, able to communicate with a biometric input device, a hardware assessment message 404 may be sent back to the application indicating capability information for the electronic device. If the capability information indicates that the electronic device is in communication with a biometric input device, a registration message 406 may be sent to the biometric input service 302. The registration manager 308 may be configured to receive the registration message 406 and register the application for notifications regarding user inputs. Later, the user may initiate a command execution request as described above in connection with FIG. 3. This command execution request may cause the registration manager 308 to notify the registered application of the existence of information corresponding to the command execution request. The application may then utilize the application programming interface 402 to request the information corresponding to the command execution request from the biometric recognition service 302. The command execution manager 322 may be responsible for responding to such a request. Alternatively, or in addition, the response may indicate the application commands are to be executed by the application.

Figure 5:
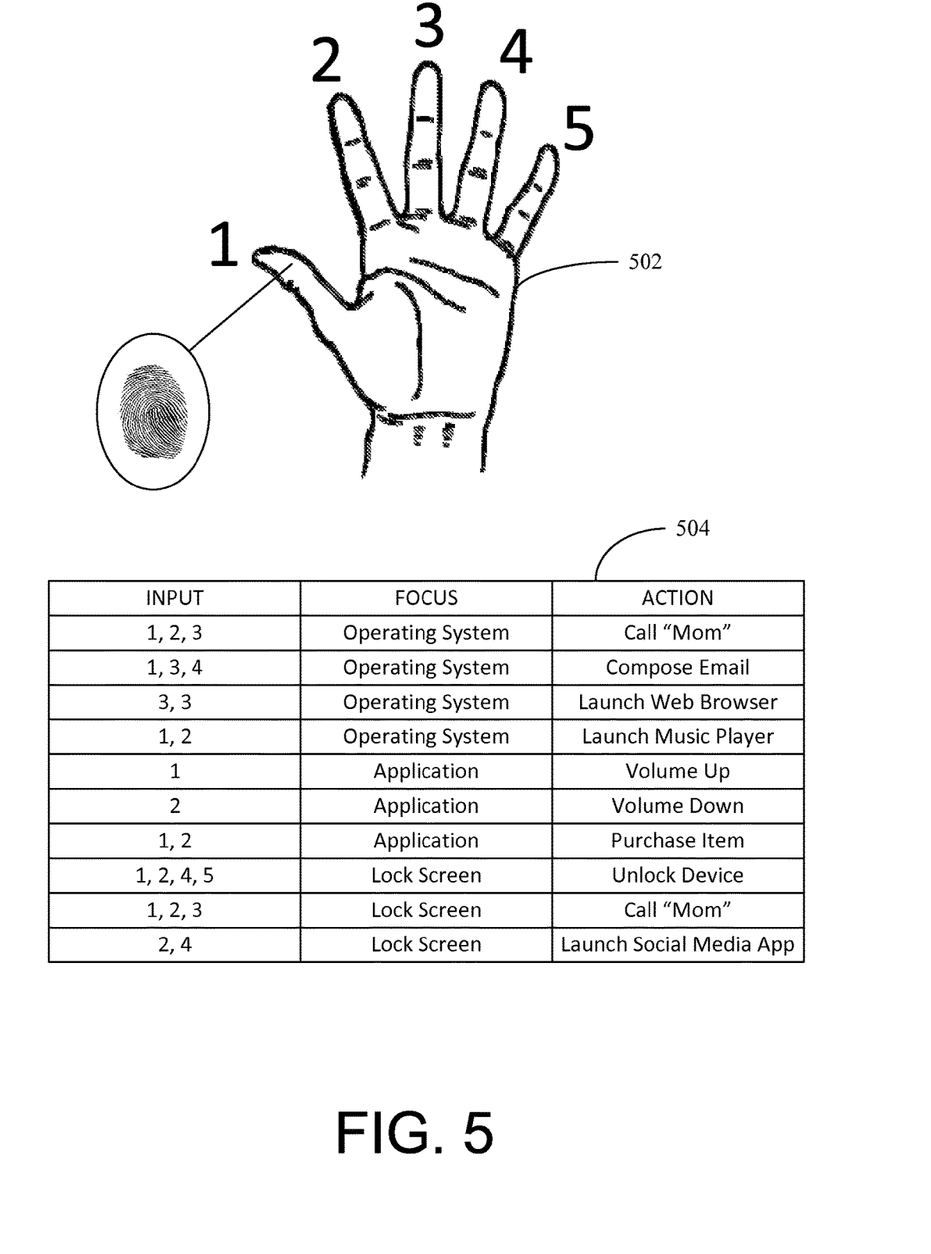
FIG. 5 is a mapping diagram depicting aspects of an example mapping utilized by a biometric recognition service in accordance with at least one embodiment.

FIG. 5 is a mapping diagram depicting aspects of an example mapping utilized by a biometric recognition service in accordance with at least one embodiment. As described above in connection to FIG. 1, a user may associate numbers with each finger of his left hand 502. As described in connection with FIG. 3, the user may indicate a combination of fingerprints, a focus, and a corresponding user action. The associations described in connection with FIG. 3 may, in at least one example, be stored in a table the same or similar to the table 504. In this example, combination "1, 2, 3," initiated from the operating system is associated with the user action of initiating a phone call with the contact named "Mom." Notice, in this example, that the combination "1, 2, 3," is also associated with the user action of initiating a phone call with the contact named "Mom" if initiated from the lock screen of the electronic device. Though the same user action is used in this example, different user actions could be assigned. For instance, combination "1, 2," if initiated from the operating system, may be associated with launching a music player. However, the combination initiated from an application, perhaps the music player, may be associated with turning the volume up on the device. Combinations may include repeat identifiers, for instance, the combination "3, 3" is associated with an operating system action to launch a web browser. Any suitable combination, using any suitable number of repeated identifiers may be used. Each association between a combination, focus, and user action may be stored as a line in the table 504.

Figure 6:
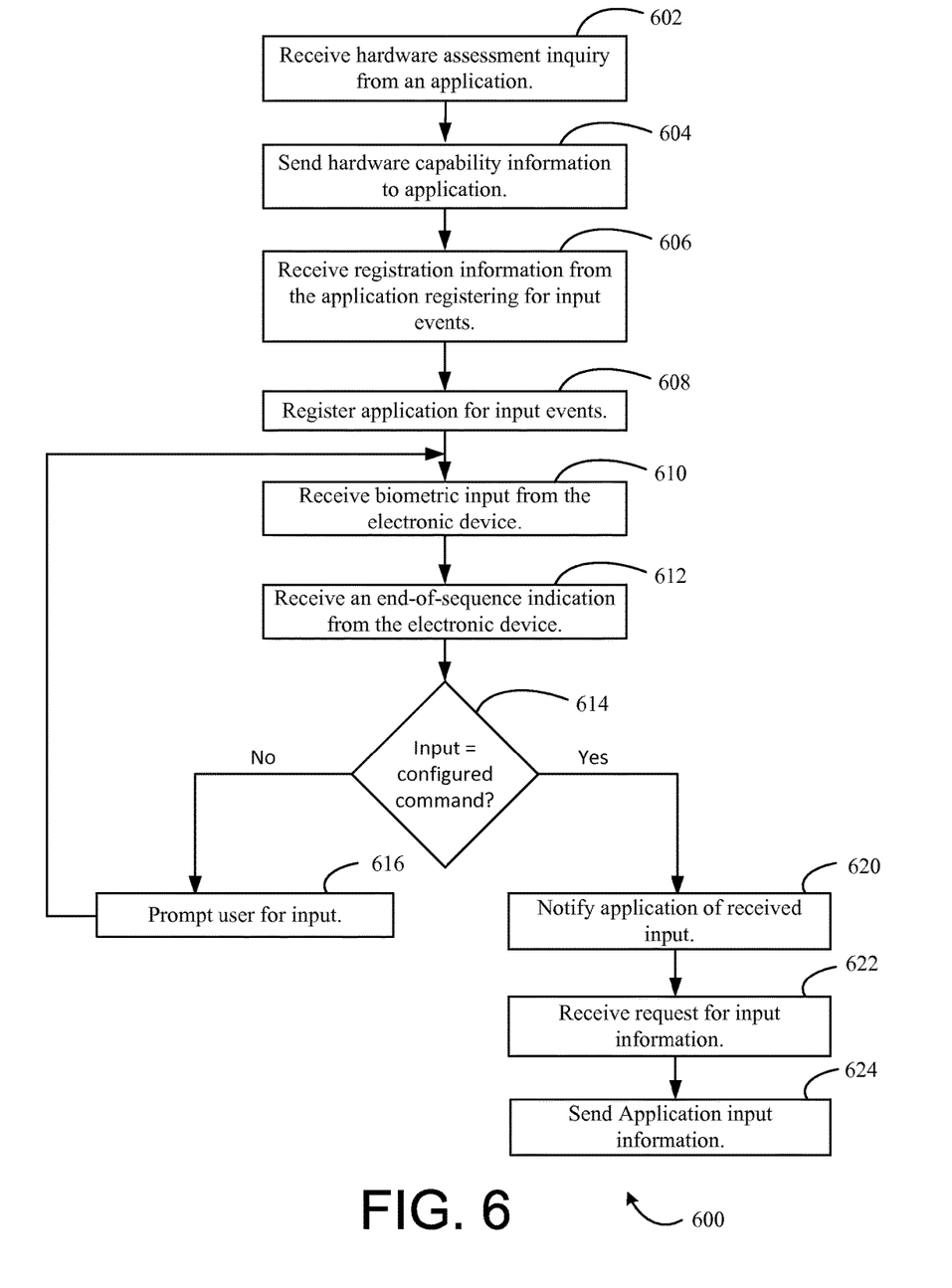
FIG. 6 is a flowchart illustrating a method for utilizing a biometric recognition service in accordance with at least one embodiment.

FIG. 6 is a flowchart illustrating a method for utilizing a biometric recognition service (e.g. the biometric recognition service 302) in accordance with at least one embodiment. The biometric recognition service 302 receives a hardware assessment inquiry from an application running on the electronic device at 602. The biometric recognition service 302 may then send a response to the application indicating the hardware capability of the device at 604. The biometric recognition service 302 may then receive registration information from the application indicating that the application is registering for input events at 606. The biometric recognition service 302 may register the application at 608. The biometric recognition service 302 may receive biometric input from the electronic device at 610. At 612, the biometric recognition service may receive an "end of sequence" indication from the electronic device. Some example stimuli for the "end of sequence" indication may include, but are not limited to tapping the device screen, giving a voice command, selecting a graphical user interface, and/or an amount of time having elapsed since the last biometric input. The biometric recognition service 302 may determine whether the input corresponds to a configured command at 614.

In this example, if the input does not correspond to a configured command, then biometric recognition service 302 may cause the user to be prompted for biometric input at 616. Steps 610-616 may be repeated until the input is determined to be a recognized command at 614.

Following a determination that the input is a recognized command at 614, the biometric recognition service 302 may notify the application of the received input at 620. The biometric recognition service 302 may then send the application the corresponding input information at 624.

Figure 7:
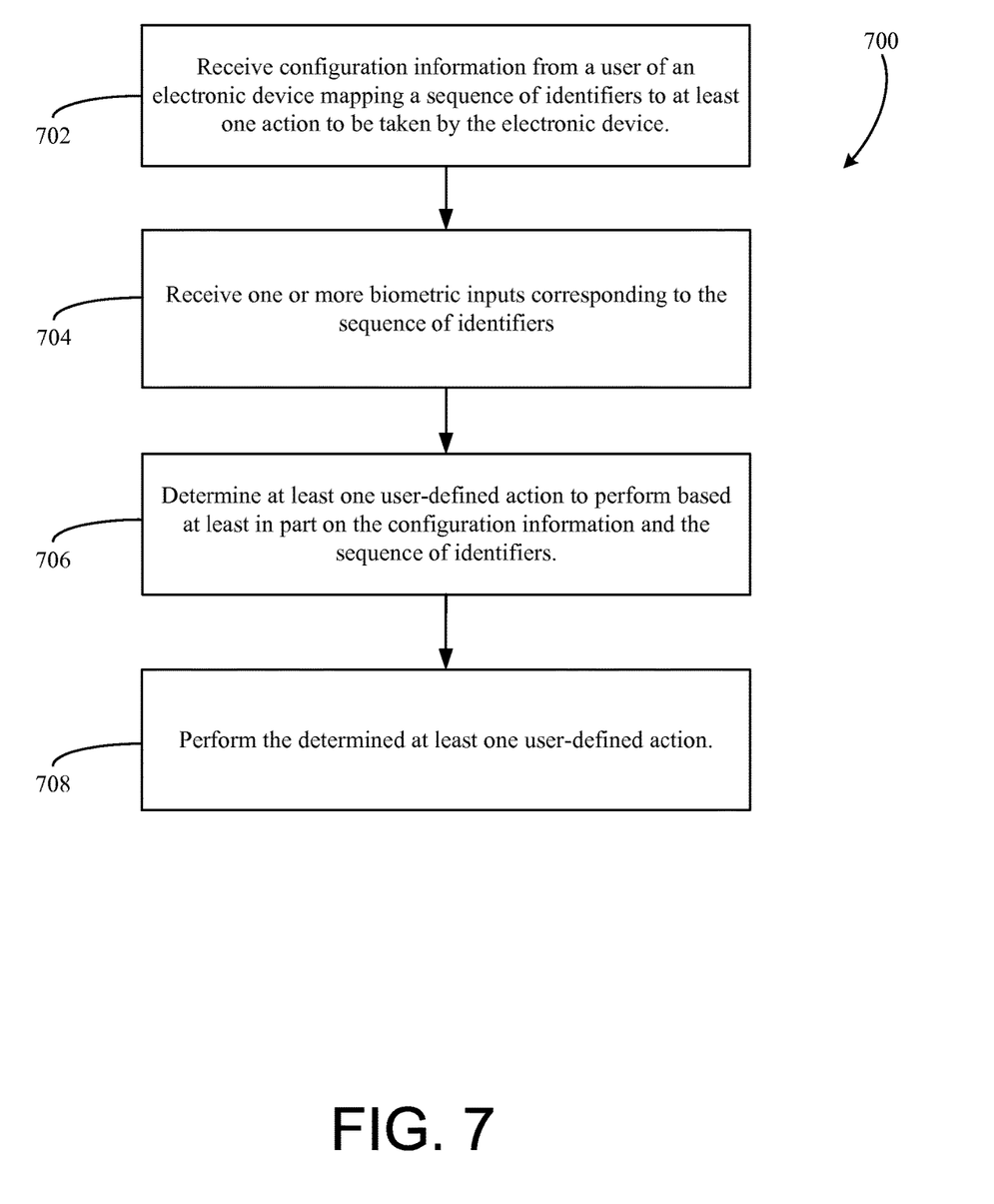
FIG. 7 is a flowchart illustrating a method for utilizing a biometric recognition service in accordance with at least one further embodiment.

FIG. 7 is a flowchart illustrating a method 700 for utilizing a biometric recognition service in accordance with at least one further embodiment. For example, the steps of method 700 may be performed by the biometric recognition service 302 of FIG. 3. In this example, method 700 may include receiving configuration information from a user of an electronic device mapping a sequence of identifiers to at least one action to be taken by the electronic device at step 702. In accordance with at least one embodiment, the biometric recognition service 302 may receive one or more biometric inputs corresponding to the sequence of identifiers at step 704. At step 706, the determination of at least one user-defined action to perform may be determined based at least in part on the configuration information and the sequence of identifiers. The determined at least one user-defined action may be performed at step 708.

Figure 8:
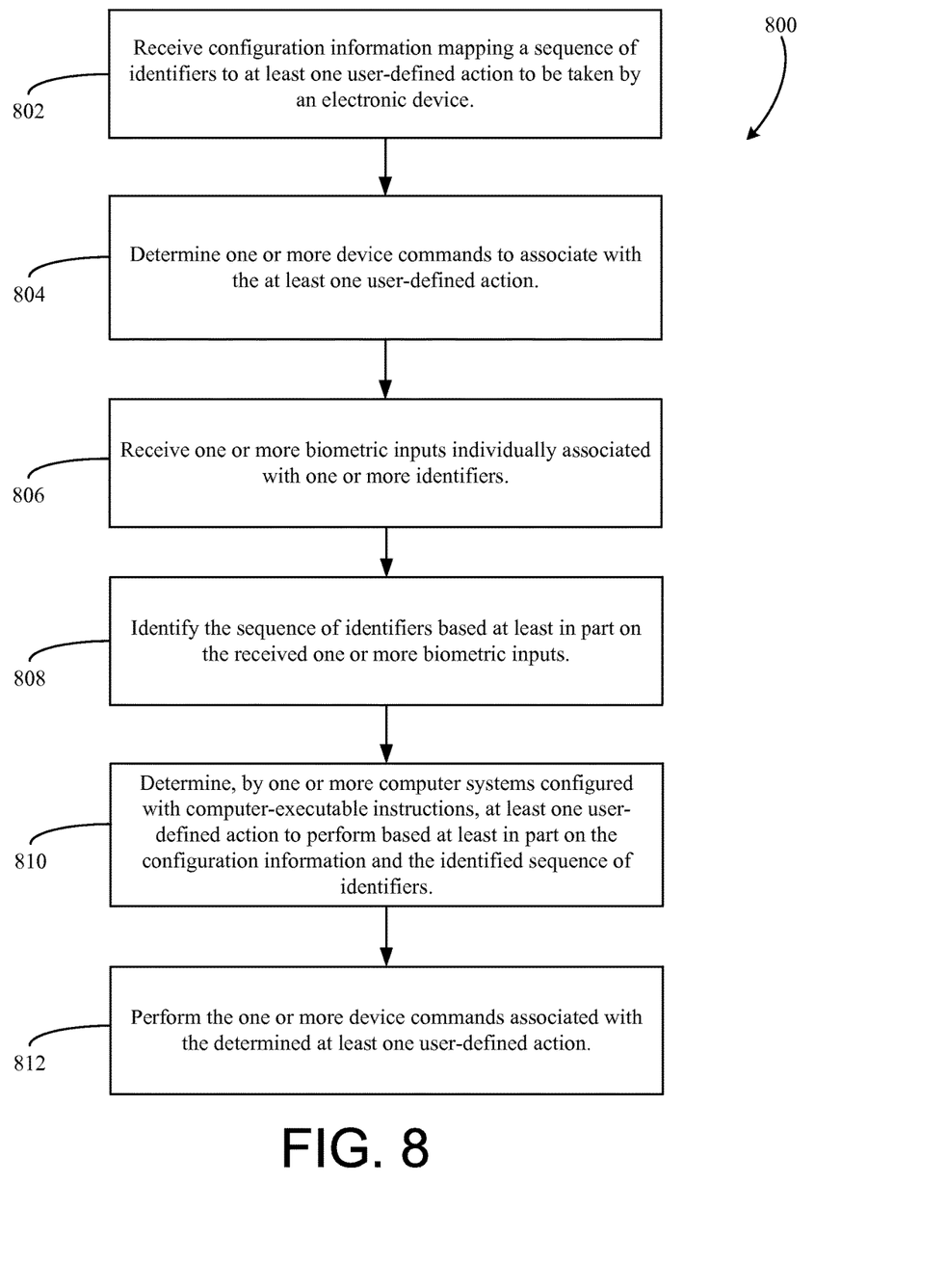
FIG. 8 is a flowchart illustrating a method for utilizing a biometric recognition service in accordance with still one further embodiment.

FIG. 8 is a flowchart illustrating a method 800 for utilizing a biometric recognition service in accordance with still one further embodiment. For example, the steps of method 800 may be performed by the biometric recognition service 302 of FIG. 3. In this example, the biometric recognition service 302 may receive configuration information mapping a sequence of identifiers to at least one user-defined action to be taken by an electronic device at step 802. At step 804, the determination of one or more device commands to associate with the at least one user-defined action may be determined. At step 806, the one or more biometric inputs may be received, each biometric input being individually associated with one or more identifiers. At step 808, a sequence of identifiers may be identified based at least in part on the received one or more biometric inputs. One or more computer systems configured with computer-executable instructions may determine at least one user-defined action to perform based at least in part on the configuration information and the identified sequence of identifiers at step 810. The one or more device commands associated with the determined at least one user-defined action may be performed at step 812.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, from an electronic device, an indication that a recording mode has been initiated by a user of the electronic device;
recording a sequence of two or more user-defined actions;
receiving an indication that the recording mode has been terminated;
in response to the recording mode being terminated, converting the sequence of two or more user-defined actions into a set of computer commands;
receiving a first sequence of fingerprint inputs from a fingerprint scanner in communication with the electronic device;
generating a first alphanumerical combination by combining a plurality of biometric identifiers individually associated with the first sequence of fingerprint inputs according to an order of the first sequence;
storing an association between the first alphanumerical combination and the set of computer commands converted from the sequence of two or more user-defined actions;
receiving a second sequence of fingerprint inputs from the fingerprint scanner in communication with the electronic device;
generating a second alphanumerical combination by combining a plurality of biometric identifiers individually associated with the second sequence of fingerprint inputs according to the order of the second sequence;
determining, with a processor device of the electronic device, that the set of computer commands are to be executed by the electronic device, the determination based at least in part on the generated first alphanumerical combination and the generated second alphanumerical combination; and
performing, with the processor device of the electronic device, the determined set of computer commands.

2. The computer-implemented method of claim 1, further comprising maintaining a mapping between the alphanumerical combination and the sequence of two or more user-defined actions.

3. The computer-implemented method of claim 1, wherein the two or more user-defined actions are capable of being performed by the electronic device.

4. The computer-implemented method of claim 2, wherein determining the set of computer commands to execute comprises identifying the two or more user-defined actions corresponding to the alphanumerical combination in the mapping.

5. A system, comprising:
at least one processor device;
a memory storing executable instructions that, when executed with the at least one processor device, cause the system to at least:
receive an indication that a recording mode has been initiated by a user of the electronic device;
record a sequence of two or more user-defined actions;
receive an indication that the recording mode has been terminated;
in response to the recording mode being terminated, convert the sequence of two or more user-defined actions into a set of computer commands;
receive a first sequence of biometric inputs;
generate a first alphanumerical combination by combining a first plurality of biometric identifiers individually associated with the first sequence of biometric inputs according to an order of the first sequence of the biometric inputs;
store an association between the first alphanumerical combination and the set of computer commands converted from the sequence of two or more user-defined actions;
receive a second sequence of biometric inputs;
generate a second alphanumerical combination by combining a second plurality of biometric identifiers individually associated with the second sequence of fingerprint inputs according to the order of the second sequence;
determine that the set of computer commands are to be performed by the electronic device based at least in part on the alphanumerical combination; and
enable performance of the set of computer commands by the electronic device.

6. The system of claim 5, wherein the two or more user-defined actions comprise at least one of user-defined operations or user-defined input sequences.

7. The system of claim 5, wherein the set of computer commands are executed by an application of the electronic device or by an operating system of the electronic device.

8. The system of claim 5, wherein the received second sequence of biometric inputs are received from the user responsive to an interaction with at least one of a lock screen of the electronic device, a home screen of the electronic device, or an application of the electronic device.

9. The system of claim 5, wherein at least one of the first sequence of biometric inputs comprise a fingerprint input of the user.

10. A system, comprising:
at least one processor device;
a memory storing executable instructions that, when executed with the at least one processor device, cause the system to at least:
determine a plurality of device commands corresponding to two or more user-defined actions, the two or more user-defined actions having been recorded by the system during a recording mode, the two or more user-defined actions being converted to the plurality of device commands, the plurality of device commands being associated with a first alphanumerical combination generated from a first sequence of two or more biometric inputs provider by a user of an electronic device;
maintain a mapping between the first alphanumerical combination and the plurality of device commands;
receive a biometric input corresponding to a second sequence of two or more biometric inputs;

determine a plurality of biometric identifiers by matching an individual biometric input of the second sequence of two or more biometric inputs received to a biometric identifier;

generate an second alphanumerical combination by combining the plurality of biometric identifiers according to an order of the second sequence of the two or more biometric inputs;

identify the plurality of device commands based at least in part on determining that the second alphanumerical combination matches the first alphanumerical combination in the mapping; and perform the plurality of device commands.

11. The system of claim 10, wherein the configuration two or more user-defined actions are recorded based at least in part on inputs from the user of the electronic device.

12. The system of claim 11, wherein the two or more user-defined actions are received from the user based at least in part on an interface for receiving the two or more user-defined actions.

13. The system of claim 10, wherein the plurality of device commands is identified further based at least in part on user-specified preferences indicating a preference of a first plurality of user-defined actions corresponding to a first plurality of device commands over a second plurality of user-defined actions corresponding to a second plurality of device commands, the first plurality of user-defined actions being different from the second plurality of user-defined actions.

14. The system of claim 10, wherein the mapping comprises an indication of a graphical user interface mode of the electronic device.

15. The system of claim 10, wherein the received biometric input is received utilizing a biometric reader in communication with the electronic device.

16. A non-transitory computer-readable medium having stored thereon executable instructions that, when executed by at least one computer system, cause the at least one computer system to perform operations comprising:

receiving an indication that a recording mode has been initiated;

recording a sequence of two or more user-defined actions;

receiving an indication that the recording mode has been terminated;

in response to the recording mode being terminated, determining a plurality of device commands to associate with the sequence of two or more user-defined actions;

associating the plurality of device commands with a first alphanumerical combination;

receiving a plurality of biometric inputs individually associated with one or more identifiers;

identifying a plurality of identifiers by matching individual biometric inputs of the plurality of biometric inputs to corresponding identifiers;

generating a second alphanumerical combination by combining the plurality of identifiers according to an order of a sequence in which the plurality of biometric inputs were received;

identifying the plurality of device commands to perform based at least in part on determining that the second alphanumerical combination matches the first alphanumerical combination; and performing the plurality of device commands.

17. The non-transitory computer-readable medium of claim 16, wherein the sequence of identifiers is identified after a time threshold following the received plurality of biometric inputs has passed.

18. The non-transitory computer-readable medium of claim 17, wherein the time threshold is configurable by a user.

19. The non-transitory computer-readable medium of claim 16, wherein the executable instructions further cause the at least one computer system to perform operations comprising:

receiving at least one baseline biometric input;

assigning a unique identifier to the at least one baseline biometric input; and storing the assigned identifier and the at least one baseline biometric input.

20. The non-transitory computer-readable medium of claim 19, wherein identifying the plurality of identifiers comprises comparing the received plurality of biometric inputs individually to the stored at least one baseline biometric input.

* * * * *

UNITED STATES PATENT AND TRADEMARK OFFICE
CERTIFICATE OF CORRECTION

PATENT NO.         : 9,646,438 B2
APPLICATION NO.    : 14/034309
DATED              : May 9, 2017
INVENTOR(S)        : Narasimha G It is certified that error appears in the above-identified patent and that said Letters Patent is hereby corrected as shown below:

Claim 11, in Column 13, Line 14:
Please delete "The system of claim 10, wherein the configuration two"
And insert -- The system of claim 10, wherein the two --

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*